United States Patent
Simpson et al.

(10) Patent No.: US 6,287,706 B1
(45) Date of Patent: Sep. 11, 2001

(54) FLOOR COVERINGS

(75) Inventors: Brian Robert Simpson; Robert Ashley Mein, both of Fife; David Highfield, Monmouth, all of (GB); Richard Michael Kopchik, Lancaster, PA (US)

(73) Assignee: Forbo International S.A. (CH)

( * ) Notice: Subject to any disclaimer, the term of this patent is extended or adjusted under 35 U.S.C. 154(b) by 0 days.

(21) Appl. No.: 09/494,959

(22) Filed: Feb. 1, 2000

Related U.S. Application Data

(62) Division of application No. 08/793,028, filed as application No. PCT/GB95/01855 on Aug. 4, 1995.

(30) Foreign Application Priority Data

Aug. 4, 1994 (GB) .................................................. 9415930

(51) Int. Cl.[7] .................................................. B23B 27/32
(52) U.S. Cl. ........................ 428/516; 428/523; 428/203; 428/204; 427/372.2; 427/358; 427/428; 427/385.5
(58) Field of Search ..................................... 428/515, 516, 428/203, 204, 46, 523; 264/173.12, 173.1, 173.11, 173.14, 173.16, 175; 427/372.2, 412.3, 358, 383.5, 428

(56) References Cited

U.S. PATENT DOCUMENTS

| 3,856,614 | * | 12/1974 | Susuki et al. | 428/212 |
|---|---|---|---|---|
| 5,272,236 | * | 12/1993 | Lai et al. | 526/348.5 |
| 5,278,272 | | 1/1994 | Lai et al. | 526/348.5 |
| 5,347,296 | * | 9/1994 | Lewiski, Jr. et al. | 346/153.1 |
| 5,366,779 | * | 11/1994 | Thompson | 428/96 |
| 5,416,151 | * | 5/1995 | Tanaka | 524/484 |
| 5,700,865 | * | 12/1997 | Lundquist | 524/506 |
| 5,763,501 | * | 6/1998 | Bickhardt et al. | 521/142 |

FOREIGN PATENT DOCUMENTS

| 42 22 724 A1 | 7/1992 | (DE) . |
|---|---|---|
| 0 360 577 A2 | 3/1990 | (EP) . |
| 0 366 407 A2 | 5/1990 | (EP) . |
| 0 416 815 A2 | 3/1991 | (EP) . |
| 0 515 223 A1 | 11/1992 | (EP) . |
| 90-152535 | 6/1990 | (JP) . |
| 92-125276 | 5/1992 | (JP) . |
| 1608088 | 11/1990 | (SU) . |
| 1789579 | 1/1993 | (SU) . |
| WO 96/04419 | 2/1996 | (WO) . |
| WO 96/11231 | 4/1996 | (WO) . |

OTHER PUBLICATIONS

Reference Book on Plastics (1967) edited by M.I. Garbara, M.S. Akutina, N.M. Yegorova, Khimija Publishing House, pp. 66, 73–74 (English abstract only).

* cited by examiner

Primary Examiner—Paul Thibodeau
Assistant Examiner—D. Lawrence Tarazano
(74) Attorney, Agent, or Firm—Gifford, Krass, Groh, Sprinkle, Anderson & Citkowski, P.C.

(57) ABSTRACT

The present invention relates to sheet materials suitable for use in or as a floor covering. The sheet materials comprise a polyalkene resin in intimate admixture with at least one additive comprising a filler, wherein the polyalkene resin has a relatively narrow molecular weight distribution (MWD) and, a small amount of long chain branching and produced by a single site catalysed polymerisation of at least one, linear, branched or cyclic, alkene having from 2 to 20 carbon atoms. The present invention also extends to processes for the production of such sheet materials and floor coverings.

20 Claims, 2 Drawing Sheets

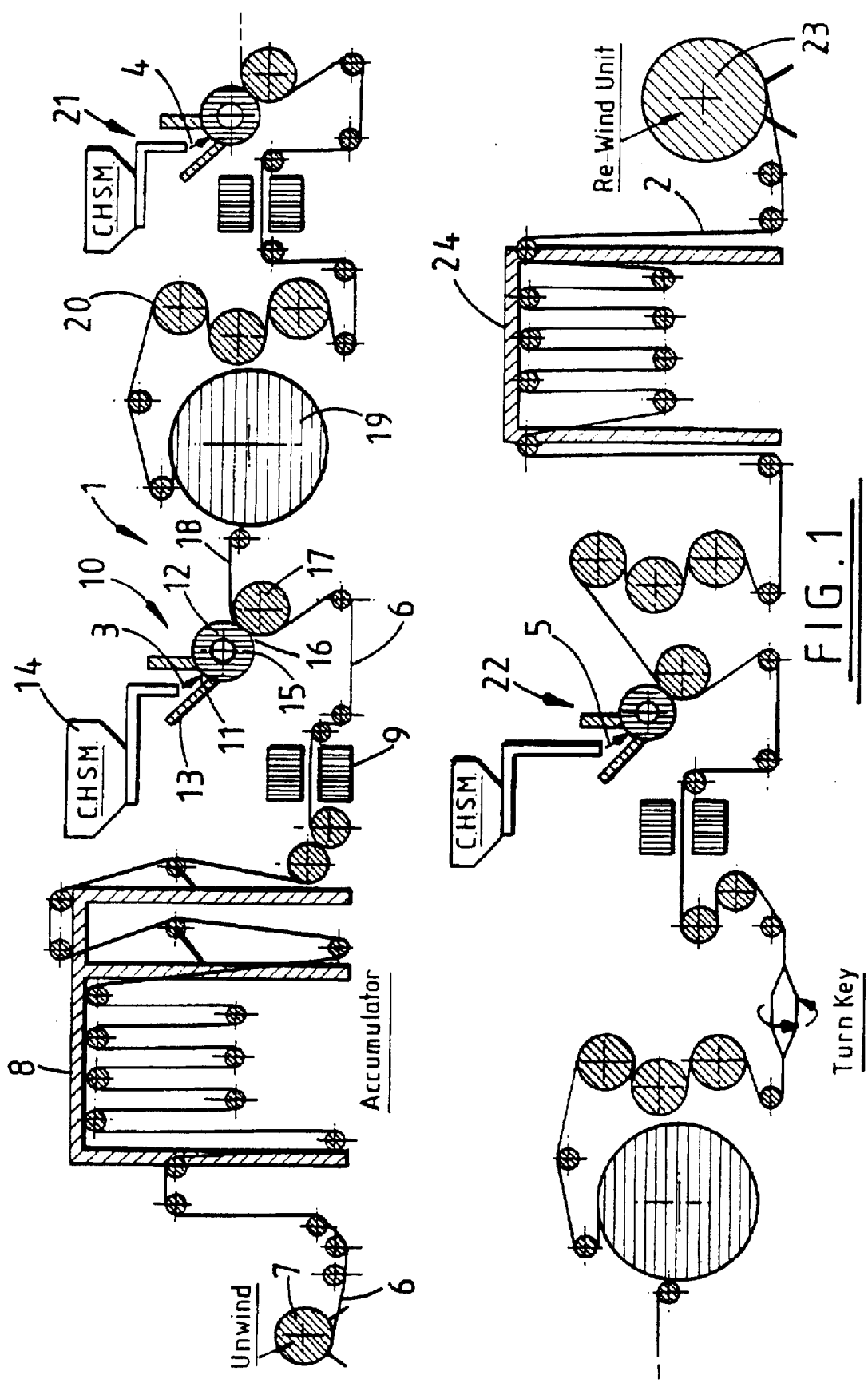

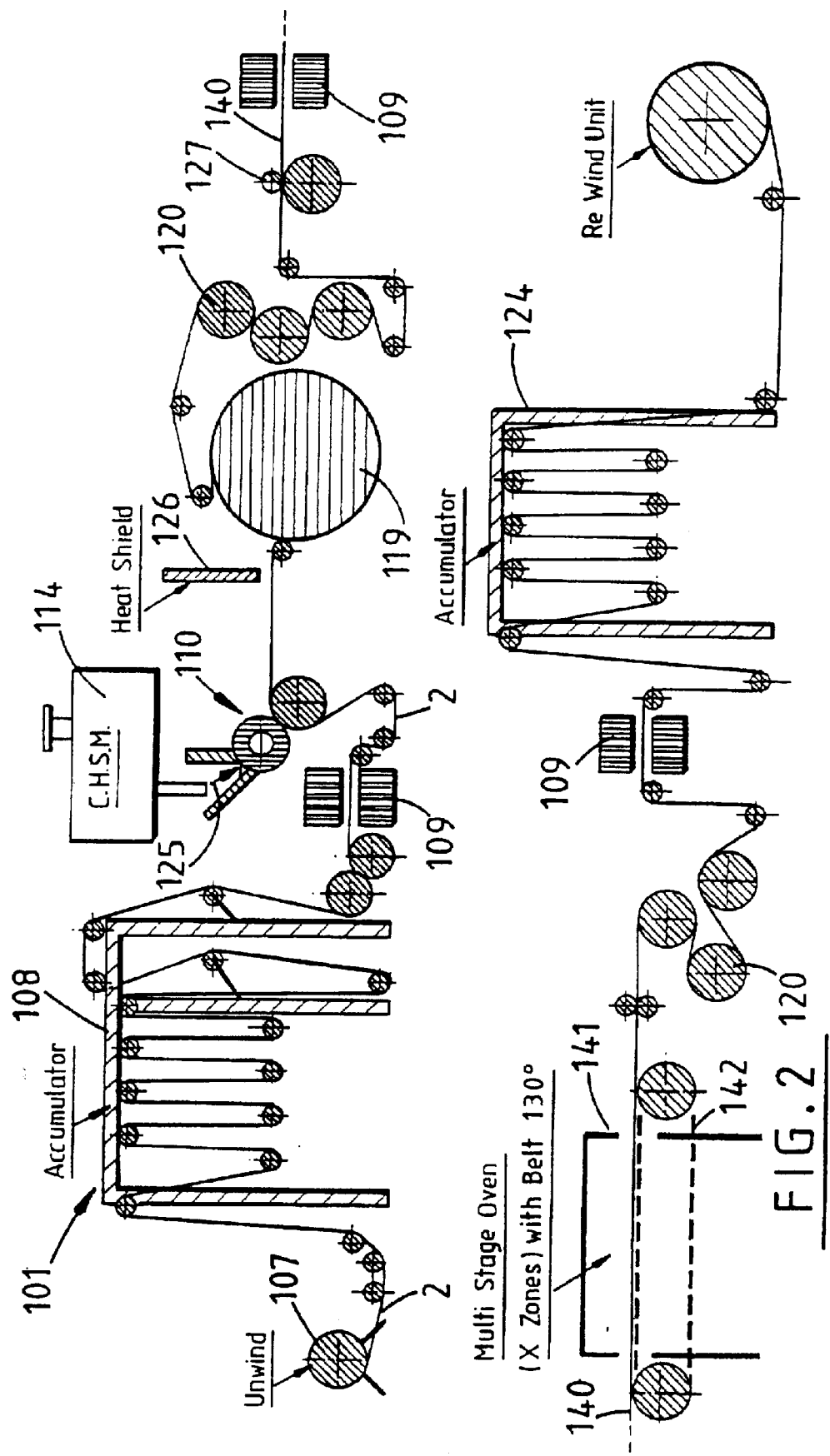

FLOOR COVERINGS

CROSS-REFERENCE TO RELATED APPLICATION

This application is a divisional of Ser. No. 08/793,028, filed Mar. 6, 1997 and presently pending which is a 371 of PCT/GB95/01855 filed Aug. 4, 1995.

FIELD OF THE INVENTION

The present invention relates to floor coverings and more particularly to durable tile or sheet form floor coverings made of one or more layers of polymers suitable for e.g. pedestrian traffic in domestic and/or other situations over an extended period of time.

DESCRIPTION OF THE RELEVANT PRIOR ART

Most floor coverings of this type are based on polyvinylchloride (PVC) polymer. In more detail, PVC polymer resin is generally mixed with a plasticiser (solid or liquid) (usually with various other additives such as fillers, polymer stabilisers, and processing aids) to form a spreadable paste which can be formed into sheets by spread coating using knife or roller coater equipment and then thermally cured e.g. by oven heating.

The use of PVC does however raise significant environmental problems due to the use of chlorine and there is accordingly a need for floor coverings based on alternative polymers. Polyalkene polymers are generally preferred from an environmental point of view but the use of conventional polyalkenes presents significant processing problems and they are not suitable for use in floor covering manufacturing facilities based on spread coating and calendering technology. In addition a particular problem in employing conventional polyalkene polymers in floor coverings, is that they do not provide the necessary physical characteristics required in the final product. In more detail floor coverings produced using conventional polyalkenes have been known to give insufficient tensile and tear strength, abrasion and stain resistance, and elastic recovery.

SUMMARY OF THE INVENTION

It is an object of the present invention to avoid or minimize one or more of the above disadvantages.

It has now been found that a particular class of polyalkenes, which are produced by single site catalysed polymerisation, can be successfully used in floor covering manufacture based on more or less conventional spread coating or calendering technology. More particularly, suitable polyalkenes in accordance with the present invention are those having a relatively narrow molecular weight distribution (MWD) and, a small amount of long chain branching and produced by single site catalysed polymerisation, and having the following characteristics:
a) Melt Index (MI) of from 0.1 to 100
b) Density of from 0.86 to 0.97; and
c) a DRI of from 0.1 to 6.0, preferably from 0.4 to 5.5.

As used herein the following terms have the meanings indicated:

Melt Index (MI) or $I_2$ is the amount (in grams) of polymer resin which is extruded in a predetermined period of time (10 minutes) as measured in accordance with ASTM (American Standard Testing Method) D-1238 (190/2.16).

Molecular Weight Distribution (MWD) is the ratio of weight average molecular weight (Mw) to number average molecular weight (Mn) (i.e. Mw/Mn).

Density is the mass (in grams) of 1 cubic centimetre of resin as measured in accordance with ASTM D-792 standard.

Dow Rheology Index (DRI) is an index of long chain branching measured by comparing the shift to the right (due to a longer relaxation time), relative to a polymer resin with zero long-chain branching (LCB), in a plot of zero shear viscosity against relaxation time (both from a cross viscosity equation).

Other abbreviations used herein which are common in the art include:

PHR—parts per hundred parts by weight of polymer resin (or principal polymer resin component).

Suitable polyalkenes in accordance with the present invention may also comprise a polyalkene having a relatively narrow molecular weight distribution (MWD) and, a small amount of long chain branching and produced by a single site catalysed polymerisation of at least one, linear, branched or cyclic, alkene having from 2 to 20 carbon atoms. Conveniently the polyalkene comprises a copolymer produced by copolymerisation of two or more alkenes comprising a first linear or branched, alkene having from 2 to 8 carbon atoms and, a second, linear, branched or cyclic, alkene having from 2 to 20 carbon atoms. This allows for greater design flexibility in relation to obtaining sheet materials with particular desired combinations of physical characteristics. In general there may be used up to 15 mole percent of said second monomer. It will of course be understood that where cyclic alkenes are used these may have more than one carbon ring and thus include bicyclic and tetra-cyclic alkenes such as norbornene and tetracyclododecene.

In another aspect the present invention provides a sheet material suitable for use in or as a floor covering and comprising a polyalkene resin in intimate admixture with one or more additives selected from a filler and a spread coating processing aid, wherein said polyalkene resin has a relatively narrow molecular weight distribution (MWD), preferably less than 3.0, and, a small amount of long chain branching and produced by single site catalysed polymerisation, and having the following characterisrics:
a) Melt Index (MI) of from 0.1 to 100
b) Density of from 0.86 to 0.97; and
c) a DRI of from 0.1 to 6, preferably 0.4 to 5.5.

One of the very versatile features of metallocene catalysts is the range of comonomer which may be incorporated into polymeric chains by using such catalysts in the single site polymerisation of alkenes. Metallocene catalysts are, for example, capable of incorporating into polymer chains cyclic monomers, advantageously polycyclic monomers, including cyclic monomers such as norbornene ($C_7H_{10}$). Thus, for example it is possible to incorporate materials such as norbornene into copolymers with ethylene, which has the benefit of raising the toughness and melting point over conventional PE resins.

The new sheet materials provided by the present invention have the further advantage of suitability for incorporating various design features. It may be possible to incorporate graphic images into the flooring in a manner which will give an image with depth perception. Systems using ion projection technology are well known in the art. These systems use an electrostatic charge corresponding to the desired image. This image is deposited on the material with a drum or belt. The material bearing the electrostatic image is moved through a developer station where a toning material opposite charge adheres to the charged areas of the dielectric surface to form a visible image. Another layer of polymer may be deposited on top of this, and another image produced in this layer. By adding successive layers, each with its own image, it is possible to built a structure with an image depth perception. This art, using conventional resins, is explained in U.S. Pat. No. 5347296.

One advantage of using polymer prepared using metallocence-derived catalysts comes about during the image process. More particularly the use of metallocene catalysts permits the incorporation of boron containing end groups and/or very high levels of unsaturation. These end groups may be functionalized to provide additional means for facilitating imaging. Images may be created either via electrostatic projection systems or by functionalizing these end groups so the polymer chains will better combine with toner or pigments.

In another aspect the present invention provides a sheet material suitable for use in or as a floor covering and comprising a polyalkene resin in intimate admixture with at least one additive comprising a filler, wherein said polyalkene resin has a relatively narrow molecular weight distribution (MWD) and, a small amount of long chain branching and produced by single site catalysed polymerisation of a first, linear or branched alkene having from 2 to 8 carbon atoms and, preferably a second, linear, branched or cyclic, alkene having from 2 to 20 carbon atoms.

Whilst processing aids may be used in the new materials of the present invention, to adjust or accentuate particular processing characteristics such as reduced energy requirements and/or increased processing speed, it is a feature of the polyalkene resins used in the present invention that they do not require the use of a plasticiser thereby significantly reducing environmental problems cause by the migration of liquid plasticizers out of the material and/or loss of performance associated with the use of plasticisers.

Nevertheless, in those cases where it is desired to increase processability, then there may be used a processing aid or plasticiser, and it is an advantage of the present invention that a significantly smaller amount of plasticiser can be used as compared with polymer resins conveniently used in floor coverings. In a particularly preferred form of the invention there is, moreover, used a plasticiser or processing aid comprising a selectively polymerisable liquid monomer system which is substantially non-polymerisable under the sheet forming, e.g. extrusion, spread-coating or calendering, conditions used in the floor covering sheet material manufacturing process whilst being substantially polymerisable subsequently so as to produce a material substantially free of liquid plasticiser. In general the polymerisable monomer may be used in an amount relative to the polyalkene resin of from 20 to 80:80 to 20. Further details of suitable plasticisers are discussed hereinbelow.

In this connection it will be understood that there is normally used an initiator substance in order to induce polymerisation of the monomer and which is included together with the monomer in the monomer system. Accordingly in such cases it is important that the initiator is one that is selectively activatable i.e. is substantially inactive under the polyolefin product forming conditions but may subsequently be activated under suitable plasticiser monomer polymerisation or curing conditions.

Various polyalkene resins suitable for use in the materials of the present invention are known in the art. In general they are produced by polymerisation of alkene monomers in the presence of particular catalysts which restrict the progress of the polymerisation and are known as metallocenes (the resulting polymers being commonly referred to as metallocene polyolefines conveniently abbreviated as MPOs).

Such polyolefines and processes for their production are described in, inter alia, U.S. Pat. N0. 5,272,236.

Preferred polyalkenes that may be mentioned comprise copolymers of ethylene and an alpha-alkene having from 4 to 20 carbon atoms, advantageously from 4 to 10 carbon atoms, for example propylene butene-1, or hexene-1, or a cyclic olefine such as norbornene; copolymers of propylene and an alpha-alkene having from 2 to 10 carbon atoms, for example butene-1, hexene-1, of a cyclic olefine such as norbornens; and copolymers of 4-methyl-1-pentene and an alpha-alkene having from 2 to 10 carbon atoms, for example, butene-1, hexene-1, or a cyclic olefine such as norbornene. Preferably there is used a copolymer containing up to 15 mole percent of comonomer. It will moreover be appreciated that there may be used more than one comonomer, that is, there may for example be used a terpolymer wherein are employed two different alpha-alkenes each having for 2 to 20 carbon atoms.

Suitable polyalkene resins that are commercially available from the Exxon Chemical company of USA and the Dow Chemical company of Midland, Mich., USA, are listed in Tables 1 and 2 below.

TABLE 1

Exxon's EXACT (TM) Resins

| Product | Key Properties | |
|---|---|---|
| EXACT 3017 | Density | 0.901 |
| | MI | 27 |
| EXACT 3025 | Density | 0.910 |
| | MI | 1.2 |
| EXACT 4038 | Density | 0.885 |
| | MI | 125 |
| EXACT 4041 | Density | 0.878 |
| | MI | 3.0 |
| EXACT 5008 | Density | 0.865 |
| | MI | 10 |
| EXACT 4006 | Density | 0.880 |
| | MI | 10.0 |
| EXACT 4003 | Density | 0.895 |
| | MI | 9.0 |
| EXACT 4023 | Density | 0.882 |
| | MI | 35.0 |
| EXACT 4033 | Density | 0.880 |
| | MI | 0.80 |

TABLE 2

Dow's INSITE (TM) TECHNOLOGY POLYMER (ITP)

| Product | Key Properties | |
|---|---|---|
| ENGAGE CL8200 | Density | 0.870 |
| | MI | 5.0 |
| | DRI | 0.5 |
| ENGAGE CL8150 | Density | 0.868 |
| | MI | 0.5 |
| | DRI | 2.0 |
| AFFINITY SM1300 | Density | 0.902 |
| | MI | 30.0 |
| | DRI | 0.4 |
| AFFINITY SM1250 | Density | 0.885 |
| | MI | 30.0 |
| | DRI | — |
| ENGAGE LG 8005 | Density | 0.870 |
| | MI | 1.0 |
| | DRI | 2.0 |

In a further aspect the present invention provides a polymer resin-based floor covering comprising at least one layer of a sheet material of the invention. It will be appreciated that in general such floor coverings comprise two or more different layers having particular functions, bonded together. Typically there may be included layers such as a foamed layer to provide cushioning; a structural layer comprising a reinforcing carrier or substrate impregnated and/or coated with a saturant formula; a solid backcoat layer; and a clear protective or topcoat layer.

For some types of applications little or no expansion in some or all layers of the floor covering structure will be required. The current invention includes a range of floor covering systems from those wherein all layers, except the topcoat, are foamed to those where none of the constituent layers are foamed.

The sheet materials of the invention may be produced by a process comprising the steps of:

providing a suitable polyalkene resin in accordance with the present invention and at least one additive comprising a filler and optionally a sheet formation, typically a spread coating or calendering, processing aid;

bringing said polyalkene resin into intimate admixture with said at least one additive in a high shear mixer for a period of at least 10 minutes at an elevated temperature of at least 75°, preferably from 100 to 250° C., most preferably from 130 to 200° C., for melting the polyalkenes and sufficient to bring the mixture into a substantially fluid state without substantial degradation of the mixture; forming the fluid mixture into a sheet form; and allowing said sheet to cool and solidify.

In one preferred aspect of the invention there is used a said fluid mixture which is substantially free of any plasticiser. Nevertheless, as discussed elsewhere herein, there may be included in the mixture one or more plasticisers or processing aids. Where there is used a polymerisable plasticiser, then the process includes further treatment of the solidified sheet in order also to solidify the plasticiser. Where a fugitive plasticiser is used the process advantageously includes the step of volatilizing said plasticiser.

The sheet material production processes of the present invention have significant advantages over those made using conventional polyalkene or polyolefin resins. Apart from the superior processability which allows the use of conventional existing production plant previously utilizes for PVC resin based sheet materials with minimal modifications, they also have lower energy consumption costs due to the substantially reduced curing temperatures required as compared with PVC resin based production which involve increasing temperature to effect a thermal curing as opposed to a cooling to effect "crystallisation curing" by "solidification". Further benefits that can be obtained in relation to particular floor covering layers in products of the invention include better toughness of the outer clear coat layer with better impact resistance resulting from the lower crystallinity associated with lower density; better cell recovery in foamed cushioning layers; and better filler acceptance due to more homogenous nature of the polymer (narrow MWD); and good flowability of the saturated layer resulting from high MI with little or no comonomer blocking.

1. In relation to the various aspects of the present invention it will be appreciated that other polymer resins outside those specified may be used in admixture with the specified ones e.g. in order to "extend" the specified polyalkene resin for reasons of economy by using a cheaper polyalkene resin, or to modify finish or other characteristics. The amount of such other polymer resin that may be used will depend primarily on how they affect the fluidity and spread coating characteristics of the materials of the invention. Thus for example there may be used up to around 50 to 60% w/w of said other polymer resin (relative to the total polymer resin) depending on the required use and properties of the sheet layer. Thus, for example, in relation to the clear coat layer, the amount of such other polymer resin would normally be restricted to a lesser amount of not more than around 15 to 20% w/w.

Additives that may be used in the materials of the present invention and the amounts thereof, will depend on the function and desired properties of the sheet material and may also, to some extent, depend upon the particular polymer resins used. Principal additives and additional processing steps generally well known in the art, that may be mentioned include the following:

Inorganic fillers and reinforcements can enhance the various polyolefin based layer or layers in the floor covering material, which is the subject of this invention. This enhancement can be through improvements in appearance, physical properties, or chemical characteristics. The particular inorganic filler/reinforcement attributes that are important are the nature of the inorganic material, the shape of the material, and any surface treatment or coating. There are many important aspects of the inorganic material. Density is important in the application and long term utility of a floor covering. Highly filled back coat layers (e.g. up to 85% by weight of filler) can be very useful in this regard. Another basic material attribute is hardness. Increased hardness is desirable in the final product, but too hard a filler (such as silica) can have negative effects on the wear of processing equipment, such as melt mixers and extruders. Table A lists some common inorganic fillers/reinforcers.

TABLE A

| INORGANIC MATERIAL | DENSITY g/cc | HARDNESS MOBE SCALE |
|---|---|---|
| Calcium Carbonate | 2.7 | 3 |
| Talc | 2.9 | 1.5 |
| Mica | 2.8 | 3 |
| Glass Fibres | 2.9 | — |
| Silica | 2.5 | 7.0 |
| Wollastonite | 2.9 | 4.7 |
| Aluminium Trihydrate | 2.4 | 3.0 |
| Magnesium Hydroxide | 2.3 | 2.0 |
| Titanium Dioxide | 4.2 | 7.0 |

Whiting filler is used to increase opacity. Generally there is employed less than 500 PHR, preferably from 20 to 120 PHR in saturant formula and foamable cushioning materials and up to 200 PHR in solid backing layers.

The optical properties of titanium dioxide make it a particularly good pigment in obtaining a white colour with good opacity. Such a colour is desirable in the layer upon which the printed design is placed. This is located belong the transparent wear layer. Lower levels of titanium dioxide (2 to 6 PHR) can be employed if a white filler such as Calcium carbonate is used at moderate levels in this layer. Calcium carbonate is of particular utility in polyolefin based compositions. Hardness, stiffness, heat deflection temperature, slip resistance, stress crack resistance, weldability, printability, and antiblock characteristics are all improved. Thermal shrinkage and elongation, as well as water vapour and oxygen permeability are decreased.

Talc is another filler well suited to enhance polyolefin formulations for floor covering. It has a lamellar structure in contrast to the low aspect particulate structure of calcium carbonate. This lamellar form allows talc to be more effective than calcium carbonate with regard to increasing stiffness, heat deflection temperature and dimensional stability. The disadvantage of talc relative to calcium carbonate centre on reduced impact strength, matt surface, and lower thermooxidative stability. Mica also has a lamellar structure and has similar advantages and disadvantages.

High aspect ratio fillers/reinforcements such as wollastonite and glass fibres, have an even stronger effect than talc and mica on increasing the modulus of elasticity, tensile strength, and heat-distortion temperature of polyolefin based systems.

The improvements provided by high aspect ratio inorganic additives would be of particular assistance in these floor covering systems made using a permanent plasticizer or processing aid, such as liquid paraffin. In these cases, the stiffening action of such additives would compensate for the loss of stiffness produced by the liquid paraffin.

Silica in its fumed or precipitated forms can be useful at low levels (0.1 to 1.5%) in the polyolefin formulations where antiblocking and printability is of importance. In the floor covering system these would be in the wear layer and in the layer upon which the printed design is applied.

Alumina trihydrate and magnesium hydroxide, in the correct particle sizes which for most systems are less than 40 microns in diameter, can provide the same type of property enhancement provided by calcium carbonate. In addition, they can provide useful fire resistance and smoke control characteristics. This will be discussed in more detail in the fire resistance section.

2. Polyolefin materials for floor covering systems are enhanced by the use of the thermal and light stabilizers. For thermal stabilizers the amount and type that should be used will vary with the actual process used to fabricate the final structure. The melt spreader approach will provide a product having less heat history than either the melt calendering or extrusion routes. In all cases that involve foamed systems, however, the polyolefin resins will be exposed to temperatures over 180° C. for some time during the process.

Suitable stabilisers include hindered phenol at from 0.05 to 0.30 PHR, optionally with co-stabilisers e.g. organosulphur compounds such as DSTDP at from 0.2 to 1.0 PHR. More particularly good thermal stability can be obtained in these polyolefin systems using a high molecular weight hindered phenol, such as ZRGANOX (™) 1010 from Ciba-Geigy, with one or more secondary antioxidants such as thioethers and phosphorus compounds. Distearylthiodipropionate (DSTDP) and ULTRANOX 626 from GE are examples of these types of materials. An effective thermal stabilizer package from such systems is 0.1% IRGANOX 1010, 0.1% DSTDP and 0.05% ULTRANOX 626.

Hindered amine light stabilizers (HALS) are particularly effective in protecting polyolefins from photo-oxidation. A Polymeric HALS, such as LUCHEM HA-B18 (™) from Atochem, is particularly effective in its own right and has the added advantage of showing no antagonism for other additives such as DSTDP. The inclusion of 0.3% of LUCHEM HA-B18 in the outer wear layer and 0.15% in the layer just below the transparent wear layer will greatly enhance the light resistance of the subject polyolefin floor covering system.

3. Lubricants and processing aids may be of assistance in the manufacture of the polyolefin based flooring system. This will be very dependent on the specific process. For extrusion or melt calendering operations an external lubricant may be of assistance. Calcium and zinc stearate are appropriate as external lubricants. They also can provide some additional stabilization support. They can be added in the 0.1 to 1.0%, preferably 0.2 to 1.0% range is needed.

4. Depending on the spread coating or calendering process and conditions, melt strength enhancement of the polyolefin system may be useful. Grafts of polyolefins and acrylics are useful at the 0.1 to 1.0% range in proving a stronger more elastic melt.

5. In the polyolefin based floor covering which is the subject of this invention, for most applications it is desirable to have one or more of the layers in the structure (but not the wear layer) to be expanded in the form of a close cell foam. One effective route to such an expanded layer is through the use of a chemical blowing agent. In polyolefin systems azo compounds are especially effective. An example of this class of compounds is Azodicarbonamide (CELOGEN AZ (™)from Uniroyal). A particularly useful feature of this compound is that its decomposition point can be reduced from 220° C. to less than 170° C. through the use of activators, such as zinc oxide. This activated system can be deactivated through the use of inhibitors such as benzotriazole. If inks containing benzotriazole are used to print on the surface of a polyolefin containing CELOGEN AZ and Zinc Oxide and the resulting structure, with a wear layer added over the foamable layer, is heated to temperature between the activated and inactivated decomposition temperatures, then a raised pattern (chemical embossment) is created in the sample.

A supplemental blowing agent such as aluminum trihydrate may be employed in these structures. Although its primary role is that of a flame retarding additive and inorganic filler it has a useful auxiliary role as a blowing agent in that it gives off water vapour when heated above 200° C. A volatile fugitive processing aid or plasticizer can also have a useful role as a supplemental blowing agent.

In the case of azodicarbonamide this is generally used for foamable cushioning layers at from 2.0 to 4.5 PHR, together with a suitable foaming activator such as zinc oxide.

Some or all chemical blowing agents can be replaced with mechanical foaming, given the correct conditions. Such conditions involve the mixing into the polyolefin based mixture, that will become one of the layers in the floor covering material, air or another gas, under conditions that will produce the desired number and size of cells in the resulting foam. In the spread coating system the mixture applied needs to have a foam structure near to that of desired product. In the extrusion or calendering process the gas needs to be in solution in the polymer or as small micro bubbles at the melt pressure in the extruder system. Expansion takes place as the melt leaves the extruder and goes from high pressure (100 to 700 PSI) to atmospheric pressure. In both cases, it is important for the cell structure to be frozen at the desired size by a rapid drop in the sheet temperature to below that needed for cell contraction or deformation.

6. The properties of the polyolefin structures in the subject floor coverings can be enhanced through the use of crosslinking, conveniently by means of an organic peroxide e.g. at from 0.1 to 5.0 PHR for increasing toughness and/or stiffness of the sheet layer. Dicumyl peroxide is a reagent used extensively for such reactions. This material becomes an effective crosslinking agent at 190° C. In the case of crosslinked foamed polyolefin systems it is known that a better foam cell structure is developed if the crosslinking is done before the foam is formed. In systems involving CELOGEN AZ for foaming and dicumyl peroxide for crosslinking, both processes would take place at the same time and temperature. If a peroxide with a lower activation temperature, such as 2,2-bis (tert. butylperoxy) butane were used then the crosslinking could be carried out at about 170° C. followed by a foaming process at 190° C.

The development of strong crosslinked filled foam polyolefin systems can be further enhanced by treating the inorganic filler to be used with vinyl silane. The vinyl groups that become attached to the filler particles become active in forming the cross linked network initiated by the peroxide produced free radicals.

In non-expanded layers Dicumyl peroxide would be a good crosslinking agent. In layers to be expanded, using 2,2-bis (tert. butylperoxy) butane in conjunction with an activated CELOGEN AZ blowing system would be desirable. In all filled layers to be foamed, the filler should be treated with an agent such as vinyl silane that will provide sites of unsaturation on the filler particles.

7. The flammability and smoke generation of the polyolefin based floor covering system is of importance. Fire characteristics can be improved through a wide range of additives. Various inorganic compounds, such as aluminum trihydrate and magnesium hydroxide, that give off water at elevated temperatures are useful as dual fillers/flame retardants. Phosphorous compounds, borates, and zinc oxide all can play useful roles in improving the fire characteristics of polyolefin bases systems.

8. polymer resins other than the specified MPOs may be used as noted above as extenders or modifiers in amounts of from 10 to 30 PHR. Examples that may be mentioned include LLDPE (Linear Low Density PolyEthylene), EVA (Ethylene Vinyl Acetate), Ionomers e.g. SURLYN (™) available from the DuPont Company, and VLDPE (Very Low Density PolyEthylene).

In addition, blends of two or more metallocene prepared polyolefins may be used to obtain particular combinations of desired properties.

To improve impact properties various types of elastomeric component additives can be used in generally known manner. These generally comprise small particles with a core of an elastomer e.g. butadiene or acrylic polymer coated with an outer shell that will provide good adhesion to the MPO polymer resin matrix. An example of such an elastomeric component core/shell modifier additive is PARALOID EXL-330 from the Rohm and Haas Company. This resin has an acrylate rubber core and a polymethyl methacrylate shell. Other types of modifiers that can be used to enhance impact properties include EPDM rubbers, such as POLYSAR (™) manufactured by Bayer; A/B/A block copolymers, such as KRATON (™) manufactured by Shell; and multiple domain elastomer systems, such as those described in European Patent No. 583,926.

9. Other additives that may be mentioned include dyes, inks, antioxidants etc. which are generally used in relatively small amounts at less than 50 PHR. Antistatic characteristics can also be important for some applications.

In this case, the use of various internal antistatic agents in the wear layer would be appropriate. Many antistatic additives are compounds with hydrophilic and hydrophobic sections. A common material of this type is a mono ester of a polyol, such as glycerol, with a long chain fatty acid, such as stearic acid. The polyol portion is very polar and would come to the surface of a polyolefin, while the fatty acid is "polyolefin-like" and would stay within the plastic 9. The hydrophilic part can be cationic, anionic, or non-ionic. Levels of 0.1 to 0.5 PHR in the outer layer of the structure are appropriate.

10. Carriers or substrates used with saturant formulations may have various forms e.g. woven or non-woven mesh or fabric, or tissue, of more or less thermally stable materials such as glass fibre.

The polyalkene or polyolefin resins used in accordance with the present invention may be of various different types including random bipolymers and terpolymers, and block copolymers, based on a variety of monomer units including lower alkene, preferably 1-alkene, having from 2 to 8 carbon atoms e.g. propylene but most preferably ethylene; dienes; cycloalkenes; and vinyl aromatic compounds.

Further preferred features of the invention will appear from the following detailed Examples given by way of illustration and the accompanying schematic drawings in which:

BRIEF DESCRIPTION OF THE DRAWINGS

FIG. 1 is a schematic side view showing a first part of a floor covering production line; and FIG. 2 is a similar view of the second part of the production line of FIG. 1.

DETAILED DESCRIPTION OF THE PREFERRED EMBODIMENTS

FIG. 1 shows a first-stage production line 1 for producing a first-stage three layer sheet material 2 by applying saturant, foam gel, and back-coat layer formulations 3, 4, 5 onto a glass fibre tissue web (approx. 0.45 mm thick) 6 supplied from a supply drum 7 via a first accumulator 8. The tissue web is passed via a first weight/unit area measuring system 9 to a first spread coating unit 10 at which the hot melt saturant formulation 3 (at approx. 90° C.) is applied onto one side 11 of a first roller 12 to a predetermined thickness of about 0.55 mm controlled by a first knife 13, from a first continuous high shear barrel-type mixer 14. At the other side 15 of the first roller 12, the saturant formulation is transferred to the tissue web 6 at a nip 16 between the first roller 12 and an opposed tissue web support roller 17. The impregnated tissue web 18 is then passed around a large diameter chilled drum 19 set for a surface temperature of around 25 to 40° C. and further smaller diameter cooling drums 20 for "crystallisation curing" or solidification.

The hot melt foam and back-coat layer formulations 4, 5 are then successively applied to the coated tissue web 18 at approximate thickness of 0.2 and 0.6 mm, respectively, in generally similar manner at second and third spread coating units 21, 22, except that a large diameter chilled drum 19 is omitted at the back-coat layer stage. The resulting three layer sheet material 2 is then collected on a wind-up drum 23 down-stream of a second accumulator 24. If desired this sheet material is then passed to a rotogravure or other printing station for application of graphic design material etc. in generally known manner, for example, using ink designed for chemical embossing.

FIG. 2 shows a second stage production line 101 in which like parts corresponding to those in FIG. 1 are indicated by like reference numerals to which have been added 100. The three layer sheet material 2 produced in the first stage production line 1 is supplied from a supply drum 107 via an accumulator 108 to a fourth spread coating unit 110 at which a clear coat formulation 125 is applied to said sheet material 2 at a thickness of about 0.2 mm, and cured as before except that in this case a heat shield 126 is provided between the chilled drum 119 and the hot mixer 114 to help improve temperature control etc.

If desired a further foamed back-coat layer may be applied using yet another spread-coat applicator (not shown). It will incidentally be appreciated that in accordance with common practice in the industry the order of application of he various layers can be varied to a greater or lesser extent.

Finally where a polish or lacquer type finish is required this can be applied using a grooved roller applicator 127.

The resulting multi-layer sheet material 140 is then passed through a multi-stage hot air oven 141 on a belt support 142 set to a maximum temperature of around 200° C. with a dwell time of around 1½ minutes to allow foaming expansion of the foam layer (from about 0.2 mm to about 0.5 mm) with selective control thereof by chemical embossing where this is used, whereupon final cooling of the finished sheet material takes place at further cooling drums 120 prior to collection on the take-up drum.

Melt calendering can also be used to produce the floor coverings which are the subject of this invention. Although both rolling sheet and viscous blank calendering can be employed, rolling sheet is preferred with a glass fibre web, being the preferred substrate.

A multilayer laminate is prepared by applying a series of melts based on the polyalkene or polyolefin resins as described in this invention. These melt calendering operations can all be done in a continuous way using a series of calendering rolls, or they may be done in a segmented fashion with a single layer being applied followed by a wind up operation with additional layers being added in separate operations. In addition, a combination of continuous and discontinuous calendering operations can be employed. Thus for example, a saturant formulation can be applied to a glass fibre web followed by a foamable layer on top and a base layer beneath. These three operations being carried out in a consecutive way as the material passed through three different sets of calender rolls before wind up. Additional processing steps can be placed between and among calendering operations. For example, the material produced by applying three polymer layers to a glass fibre web could be passed through a printing process, to provide a decorative image and to facilitate chemical embossing. This distinct printing step could be followed by another melt calendering step to apply a wear layer to the floor covering. A heat treatment step could follow the application of the wear layer, either in a continuous or discontinuous fashion. The heat treatment could expand the various layers through the formulation of a chemical foam, in those layers containing a chemical blowing agent. In addition, the physical and chemical properties of the polyolefin resins could be enhanced through crosslin formation in these layers via the use of a crosslinking system.

In the melt calendering process, a polymer melt is applied to a series of two or more heated rolls in such a wait to produce a layer of polymer of uniform thickness. The melt is prepared by mixing the polymers and non-polymeric components of the material under conditions of elevated temperatures and shear. Devices such as extruders or mixers can be used for this process. More detailed descriptions of the melt calendering process can be found in Chapter 83 of "Handbook of Plastic Materials and Technology" by Irvin I. Rubin and published by John Wily and Sons, Inc (ISBI 0-471-09634-2).

The floor covering structure, which is the subject of this invention, can also be prepared by melt extrusion. In such a process, one or more polymer layers can be applied to a continuous glass fibre web in a single extrusion operation. When co-extrusion is used to provide multiple layers in a single pass, a separate extruder is used to feed each melt to the sheet die block. Extrusion operations can be intermixed with other processing steps in preparing the final structure. For example, a glass web can be saturated and encapsulated between a base layer and foamable layer in single co-extrusion pass involving a three melt feed sheet die. This structure then can be subjected to a printing process followed by a single layer being added by extrusion. A thermal treatment can follow the application of the wear layer in either a continuous or discontinuous fashion. This treatment could enhance the final product by expansion of layers containing chemical blowing agents and/or crosslinking of layers containing crosslinking systems.

The initially described process for developing the desired floor covering structure through the use of a melt spreading approach, as shown in FIGS. 1 and 2, can be extended in scope through the use of fugitive and/or permanent processing aids or plasticizers. This involves the addition of a liquid or liquids to the various polyolefin formulations used to make the discrete layers of the final structure. Such an addition can be used to lower the temperature needed to obtain the viscosity needed for good processing. For example, white spirit, petroleum ether, or mineral spirits can be blended with a polyolefin layer system using heat and shear mixing to produce a homogenous low viscosity material which can be processed at a lower temperature than would otherwise be possible. This is a fugitive system as the white spirit or other plasticiser evaporates from the surface of the structure after the system has been applied. Preferably, the vaporized white spirit or other plasticiser is captured, condensed, and recycled. Alternatively, a non-volatile liquid plasticiser, such as liquid paraffin (mineral oil) can be used. In this case, the resulting floor covering structure will retain this material as a permanent component. Mixed systems of fugitive and permanent liquids can also be used. The range for such additives can extend from 200% to less than 5%, on a weight basis of polyolefin. Most desirably though there is used a polymerisable plasticiser.

The polymerisable plasticiser monomers that can be used in accordance with the present invention are those that are solvents for the main polymer component(s) of the polyolefin product. They need not, and would normally not, be solvents for the inorganic components nor for other components, which may themselves also be polymers, such as impact modifiers, texturing aids, pigments, and some compatibilizers. The monomers will, in general, have a long segment that is "polyolefin like" with an end group that is capable of free radical polymerization. Typical "polyolefin like" structures are hydrocarbons with ten or more carbon atoms, and examples of such groups would be lauryl ($C_{12}H_{25}$) and stearyl ($C_{18}H_{37}$). Such structures can be linear, branched, or cyclic; depending in part upon the structure of the polyolefin. The terminal polymerizable group can be a simple unsubstituted double bond, such as in 1-dodecene or a more complex unit such as a methacrylate, as in stearyl methacrylate.

Along with the plasticiser monomer or monomers, compounds that generate free radicals at elevated temperatures and optionally crosslinking monomers may be used to cure the resulting products and to provide enhanced properties. Many classes of free radical generators can be used, but materials in the peroxide, ketone peroxide, peroxydicarbonate, peroxyester, hydroperoxide, and peroxyketal families are of particular use. Also of utility are several classes of azo compounds and a variety of photo-initiators. The characteristics needed in these compounds is that they are substantially non-polymerisable i.e. remain essentially dormant during the initial mixing, compounding, and product fabrication process but can be induced to produce free radicals at a rate that will initiate a polymerization of the monomer e.g. when the temperature is increased, or when exposed to the appropriate radiation. For example a material such as t-butyl perbenzoate has a half life of over 1000 hours at 100° C., while having a half life of less than 2 minutes at 160° C. In a polymer/monomer system containing such an initiator it would be possible to process the system into the finished product form (i.e. shape or configuration) at 100° C. and then cure the system by a brief exposure at 160° C.

When polyfunctional monomers are included in the system then a continuous crosslinked polymer system can be formed from the monomer. Optionally additional radical generators can be included that will provide cross linking of the pre existing polyolefin system. A Semi-IPN (interpenetrating network) is obtained when one of the co-continuous systems (i.e. the pre-existing polyolefin and the polymerised plasticiser monomer) is crosslinked. When both systems are crosslinked an IPN is formed.

To prevent premature polymerisation of the plasticiser monomer it may be useful to add additional inhibitors to the system. Most commercial monomers are provided with inhibitors to prevent polymerization during handling and processing. The level of such inhibitors should be increased to compensate for the time spent under the polyolefin polymer product forming conditions, i.e. the conditions used to form the base polyolefin polymer into a sheet or some other shape or configuration. In this connection the temperature is usually the most significant factor, but other conditions may also be relevant. Thus for example stearyl methacrylate is commercially provided wits 275 parts per million (ppm) of the monomethyl ether of hydroquinone (MEHQ). Depending on the times and temperature involved 1000 ppm MEHQ, or more, may be needed. Inhibitors from a wide range of chemical families made be used for this purpose.

The polymeric system and the monomeric system can be combined in a variety of ways to give a low viscosity plasticised material that can be used to manufacture many types of products using several different fabrication techniques. The combination of the solid and liquid components can be done in any suitable manner e.g. by using a continuous or batch mixer, various types of continuous and batch blending devices, and various types of extruders. In all these types of equipment the solid components are mixed together at sufficient temperature and with sufficient shear to achieve both distributive and dispersive mixing. The liquid is introduced at the needed temperature and shear to dissolve the principal polymeric components and to obtain good distributive mixing and dispersive mixing of the insoluble components with the resulting fluid. The fluid system is then held at a temperature that retains the required fluidity for the fabrication of the final product form. In general this will ususally be in the from 80 to 120° C.

It will be appreciated that polymerisation of the polymerisable liquid plasticiser will result in the creation of polymer chains which extend through and interpenetrate the previously formed network of MPC polymer chains. Where both the MPO polymer chains and the polymerised plasticiser are cross-linked then the two polymer materials captively interengage each other forming a so-called interpenetrating polymer network (IPN), whilst if only one of these is cross-linked, then the non-cross-linked polymer chains could in principle be pulled out. The latter type of material is conveniently referred to as a semi-IPN. Such IPN and semi-IPN materials, whilst having generally similar physical properties to those of the other novel materials provided by the present invention, offer further advantages in terms of improved stain resistance and/or increased resistance to solvents both during installation and in use of the floor coverings provided by the present invention.

EXAMPLE 1

Preparation of Multi-Layer Floor Covering Using Calendering

A floor covering structure is prepared by first developing three layers in a continuous melt calendering operation in a first stage production line (see FIG. 1). In this operation, a continuous glass fibre mat is fed into a through station calendering line. Each station is fed by a separate melt mixer. At the first station, the glass mat is saturated with composition A. In the next station, the backing layer, composition B, is applied. In the third station, the foamable layer, composition C, is applied. The system is then taken up on a take up roll. In a separate operation this system is fed through a printing line where a decorative design is applied to the foamable layer. In a third processing step, this printed material is fed into single melt calendering station in a second stage production line and then into a two zone oven system (see FIG. 2). At the calendering station a clear top coat, composition D, is applied. In the first zone of the oven, which is at 160° C. the crosslinking of each layer occurs; in the second zone at 190° C. the expandable layer foams. The final product is then collected on a take up roll.

The compositions of the various layers are as follows:

|    |    | PHR |
|----|----|----|
| A. | (Saturant Layer) | |
|    | Exact 4038 MPO Resin | 100 |
|    | Magnesium Hydroxide Fire retardant inorganic filler | 60 |
|    | Dicumyl Peroxide free radical source for croslinking polymerisation | 2 |
|    | IRGANOX 1010 hindered phenol thermal stabilizer for reverting polymer degradation manufactured by Ciba-Geigy Corp. | 0.1 |
|    | DSTDP (Distearylthioldipropionate) thioester secondary antioxidant for preventing polymer degradations | 0.1 |
|    | ULTRANOX 626 secondary antioxidant from Berg-Warner Chemicals | 0.05 |
| B. | (Back Layer) | |
|    | EXACT 4038 | 100 |
|    | Magnesium Hydroxide | 150 |
|    | 2,2-bis (tert. butylperoxy) Butane free radical source crosslinking polymerisation | 2 |
|    |  | 2 |
|    | Irganox 1010 | 0.1 |
|    | DSTDP | 0.1 |
|    | ULTRANOX 626 | 0.05 |
| C. | (Foamable Layer) | |
|    | EXACT 5008 | 100 |
|    | Wollastonite high aspect ratio calcium metasilicate reinforcing filler | 30 |
|    | Aluminum Trihydrate flame retardant inorganic filer | 30 |
|    | Azodicarbonamide chemical foaming agent (giving off nitrogen gas) | 2 |
|    | Zinc Oxide for lowering decomposition temperature of Azodicarbonamide to reduce polymer foam temperature | 0.8 |
|    | 2,2-bis (tert. butylperoxy) Butane | 2 |
|    | IRGANOX 1010 | 0.1 |
|    | DSTDP | 0.1 |
|    | ULTRANOX 626 | 0.05 |
|    | LUCHEM HA-B18 polymeric hindered amine light stabilizer from Atochem for preventing polymer photo degradation | 0.15 |
| D. | (Top Wear Layer) | |
|    | EXACT 5008 | 100 |
|    | Vinyltriethoxysilane, providing additional crosslinking toughness and solvent resistance | 4 |
|    | 2,2-bis (tert. butylperoxy) Butane | 2 |
|    | LUCHEM HA-B18 | 0.3 |
|    | IRGANOX 1010 | 0.1 |
|    | DSTDP | 0.1 |
|    | ULTRANOX 626 | 0.05 |

EXAMPLE 2

Preparation of Multi-Layer Floor Covering Using Spread-Coating

In example 2, the same sequencing of steps and stations are used as in Example 1, except that each application station involves a melt spreading operation rather than a melt calendering operation. The composition of all the four layers is the same except that 80 parts of Jayflex 215 and 20 parts of monomer X980 (a crosslinking monomer from Rohm & Haas) are added to each of the four formulations.

It will be appreciated that various modifications may be made to the above described embodiment with out departing from the scope of present invention. Thus for example Electron Beam initiated crosslinking can be an alternative or supplemental process to chemically initiated crosslinking. Such crosslinking can be accomplished by subjecting a sample to high-energy electrons at a dose of about 6 to 8 mega rads over a 30 second to 2 minute period. The addition of a reactive monomer such as methylolpropane trimethacrylate (TMPTMA) at about 2 to 5 parts is useful to get a good result from this process.

EXAMPLE 3

Individual Layer Formulations

The following polymer resin formulations have been prepared:

| | | PHR |
|---|---|---|
| A. | (Clear coat layer) | |
| | MPO Resin ENGAGE EP8500 (Dow Chemical Co.) (MI 5.0, Density 0.87, DRI 0.5) | 100 |
| | Irganox 1010 Antioxidant Stabiliser | 0.05 |
| | BHT Antioxidant Stabiliser | 0.03 |
| | 2,5-TRI Cross-Linking Agent | 0.1 |
| B. | (Foamable Gel Layer) | |
| | MPO Resin ENGAGE EP 8500 (Dow Chemical Co.) | 100 |
| | Whiting filler (generic) | 15 |
| | Azo blowing agent (generic) | 3 |
| | Zinc oxide Foaming Catalyst | 1.5 |
| | Titanium oxide pigmentation component | 4 |
| | IRGANOX 1010 Stabiliser | 0.075 |
| | DSTDP Stabiliser | 0.05 |
| | Calcium stearate Flowing Agent | 0.10 |
| | FIREBRAKE (TM) flame retardant | 5 |
| | Antimony oxide flame retardant | 4 |
| C. | (Saturant Layer) | |
| | MPO Resin ENGAGE EP 8500 (Dow Chemical Co.) | 100 |
| | Whiting filler (generic) | 50 |
| | IRGANOX 1010 Stabilizer | 0.1 |
| | Zinc stearate Flowing Aid | 0.4 |
| D. | (Solid Backcoat Layer) | |
| | MPO Resin ENGAGE EP 8500 (Dow Chemical Co.) | 100 |
| | Whiting filler (generic) | 200 |
| | Titanium oxide pigmentation component | 4 |
| | IRGANOX 1010 Stabiliser | 0.075 |
| | DSTDP Stabiliser | 0.05 |
| | Calcium stearate Flowing Agent | 0.10 |
| | FIREBRAKE (TM) flame retardant | 5 |
| | Antimony oxide flame retardant | 4 |

EXAMPLE 4

Individual Layer Formulations

A further set of polymer resin formulations is prepared as in Example 1 above but with Dow Chemical Co.'s AFFINITY SM 1250 as the MPO Resin component in place of EP 8500.

EXAMPLE 5

Preparation of Multi-Layer Floor Covering Using Multiple Spreading

A floor covering material is prepared as a four layer structure by a multiple spreading application technique. At an initial station a glass fibre web is saturated with polymer having composition A at a temperature of approximately 100° C. At a separate station a back coating of composition B is applied to the bottom side of the polymer saturated glass web at approximately 100° C. At another separate station the foamable layer, composition C, is applied to the top side of the polymer saturated glass web at approximately 100°C. A decorative pattern is then printed upon the foamable layer using a continuous printing process that employs, in one of several inks, benzotriazole, to deactivate the accelerated foaming system thereby to produce a chemical debossing effect upon foaming. In a further separate coating step of the process a clear wear layer of composition D is applied to the foamable layer at approximately 100° C. The structure is then passed through a oven system to crosslink the layers at approximately 170° C. and then expand the foam layer to approximately 200° C. The final cured, decorated and embossed product constitutes the floor covering material.

| | | PHR |
|---|---|---|
| A. | (Saturant Layer) | |
| | EXACT 4038 MPO Resin | 100 |
| | Calcium Carbonate | 66.7 |
| | Stearyl Methacrylate (settable plasticizer) | 90 |
| | Trimethylolpropane trimethacrylate (settable plasticizer) | 10 |
| | LUPERSOL 230 (free radical polymerisation initiator from Atochem) | 5 |
| | IRGANOX 1010 | 0.1 |
| | DSTDP | 0.1 |
| | ULTRANOX 626 | 0.05 |
| B. | (Backcoat Layer) | |
| | EXACT 4038 | 100 |
| | Calcium Carbonate | 300 |
| | Stearyl Methacrylate | 90 |
| | Trimethylolpropane trimethacrylate | 10 |
| | LUPERSOL 230 | 5 |
| | IRGANOX 1010 | 0.1 |
| | DSTDP | 0.1 |
| | ULTRANOX 626 | 0.05 |
| C. | (Foamable Layer) | |
| | EXACT 5008 | 100 |
| | Calcium Carbonate | 66.7 |
| | Stearyl Methacrylate | 90 |
| | Trimethylolpropane trimethacrylate | 10 |
| | LUPERSOL 230 | 5 |
| | CELOGEN OT (chemical Blowing agent from Uniroyal) | 4 |
| | Zinc Oxide | 2 |
| | LUCHEM HA-B18 | 0.15 |
| | IRGANOX 1010 | 0.1 |
| | DSTDP | 0.1 |
| | ULTRANOX 626 | 0.05 |
| D. | (Wear Layer) | |
| | EXACT 3017 | 100 |
| | Stearyl Methacrylate | 70 |
| | Trimethylolpropane trimethacrylate | 30 |
| | LUPERSOL 230 | 5 |
| | Vinyl trimethosilane | 4 |
| | LUCHEM HA-B18 | 0.3 |
| | IRGANOX 1010 | 0.1 |
| | DSTDP | 0.1 |
| | ULTRANOX 626 | 0.05 |

What is claimed is:

1. A solid sheet polymeric floor covering, comprising a plurality of layers including a structural layer comprising a reinforcing carrier or substrate impregnated and/or coated with a saturant formula; a solid backcoat layer; and a clear protective or topcoat layer wherein at least one of said layers comprises a sheet material comprising a polyalkene resin in intimate admixture with at least one additive comprising a filler, wherein said polyalkene resin is a polyalkene resin obtained by a single site catalyzed polymerization of at least one, linear, branched or cyclic, alkene having from 2 to 20 carbon atoms.

2. A floor covering according to claim 1, which polyalkene resin has a molecular weight distribution of less than 3.

3. A floor covering according to claim 1 wherein said polyalkene is one having the following characteristics:
   a) Melt Index of from 0.1 to 100 dg/minute;
   b) Density of from 0.86 to 0.97 g/cm$^3$; and
   c) a small amount of long chain branching which amount is defined as a Dow Rheology Index of from 0.1 to 6.0 measured by comparing the shift to the right, relative to a polymer resin with zero long-chain branching, in a plot of zero shear viscosity against relaxation time.

4. A floor covering according to claim 3 wherein said polyalkene resin has a Dow Rheology Index of from 0.4 to 5.5.

5. A floor covering according to claim 1 wherein said polyalkene comprises a copolymer obtainable by copolymerization of at least two alkenes comprising a first, linear or branched, alkene having from 2 to 8 carbon atoms and, at least one comonomer, which comonomer comprises a linear, branched or cyclic, alkene having from 2 to 20 carbon atoms.

6. A floor covering according to claim 5 wherein said first monomer comprises ethylene and said at least one comonomer is selected from butene-1, hexane-1, and norbornene.

7. A floor covering according to claim 5 wherein said comonomer is present in an amount of up to 15 mole percent based on the total amount of said monomer.

8. A floor covering according to claim 1 wherein said sheet material includes a polymer, said polymer being obtainable by polymerization of a liquid plasticizer monomer system which is:
   (i) non-polymerizable under sheet forming conditions used in floor covering sheet material manufacture;
   (ii) whilst being polymerizable subsequently after forming of said intimate admixture of said polyalkene resin, and said at least one additive, together with said polymerizable plasticizer monomer system into a sheet, so as to produce a sheet material free of liquid plasticizer monomer,
   at least one of said polymer and said polyalkene resin being cross-linked so that polymer chains of said polymer and polymer chains of said polyalkene resin together form an at least semi-interpenetrating network of polymer chains.

9. A floor covering according to claim 8 wherein said plasticizer monomer comprises a linear, branched or cyclic alkene having at least 10 carbon atoms and a polymerizable terminal function group.

10. A floor covering material according to claim 1 wherein said polyalkene resin structural layer and backcoat layer contain filler.

11. A floor covering according to claim 1 which is free of liquid plasticizer.

12. A process for the production of a solid sheet polymeric floor covering comprising the steps of forming together in said floor covering a plurality of layers including a structural layer comprising a reinforcing carrier or substrate impregnated and/or coated with a saturant formula; a solid backcoat layer; and a clear protective or topcoat, at least one of said layers being produced by a process comprising the steps of:
   providing a polyalkene resin obtained by a single site catalyzed polymerization of at least one, linear, branched or cyclic, alkene having from 2 to 20 carbon atoms and at least one additive comprising an inorganic filler;
   bringing said polyalkene resin into intimate admixture with said at least one additive in a high shear mixer for a period of at least 10 minutes at an elevated temperature of at least 75° C. for melting the polyalkenes and sufficient to bring the mixture into a fluid state without degradation of the mixture;
   forming the fluid mixture into a sheet form; and
   allowing said sheet to cool and solidify.

13. A process according to claim 12 which includes the further step of incorporating into the mixture a sheet forming processing aid.

14. A process according to claim 12 wherein the sheet forming process comprises spread coating.

15. A process according to claim 14 wherein a liquid plasticizer is used as a spread coating aid in said spread coating step.

16. A process according to claim 15 wherein a liquid paraffin is used as a spread coating aid in said spread coating step.

17. A process according to claim 13 wherein the step of incorporating into the mixture a sheet formation processing aid comprises the further step of incorporating a polymerizable liquid plasticizer monomer system which is:
   (i) non-polymerizable under sheet forming conditions used in floor covering sheet material manufacture, while
   (ii) being polymerizable subsequently so as to produce a polymer material free of liquid plasticizer monomer.

18. A process according to claim 17 which process includes the further step of treating the sheet form material so as to induce polymerization of said liquid plasticizer monomer system thereby to produce a sheet material free of liquid plasticizer.

19. A process according to claim 18 wherein said sheet forming step is carried out at from 70 to 120° C. and said polymerization step is carried out at from 150 to 250° C.

20. A process according to claim 12 wherein the sheet forming process step comprises the further step of rolling said fluid mixture on a calendar.

* * * * *

UNITED STATES PATENT AND TRADEMARK OFFICE
CERTIFICATE OF CORRECTION

PATENT NO. : 6,287,706 B1
DATED : September 11, 2001
INVENTOR(S) : Brian Robert Simpson It is certified that error appears in the above-identified patent and that said Letters Patent is hereby corrected as shown below:

Title page,
References Cited - replace "5,366,779" with -- 5,399,779 --.

Column 1,
Line 42, "SUMMARY OF THE INVENTION" should be inserted before the paragraph beginning "It has now been found..."

Column 3,
Line 3, replace "built" with -- bulid --.

Column 4,
Line 10, replace "norbornens" with -- norbornene --
Line 18, replace "for" with -- from --.

Column 5,
Line 41, replace "utilizes" with -- utilized --.
Line 57, delete "1."

Column 6,
Line 13, insert -- 1. --
Line 53, replace "belong" with -- below --.

Column 7,
Line 43, replace "ZRGANOX ™" with -- IRGANOX ™ --.
Line 46, replace after "626" insert -- ™ --.

Column 9,
Line 8, replace "polymer" with -- Polymer --.
Line 21, replace "bases" with -- based --.
Line 39, after EXL-330" insert -- ™ --.

Column 10,
Line 64, replace "he" with -- the --.

Column 11,
Line 42, replace "crosslin" with -- crosslink --.
Line 45, replace "wait" with -- way --.

UNITED STATES PATENT AND TRADEMARK OFFICE
CERTIFICATE OF CORRECTION

PATENT NO. : 6,287,706 B1
DATED : September 11, 2001
INVENTOR(S) : Brian Robert Simpson It is certified that error appears in the above-identified patent and that said Letters Patent is hereby corrected as shown below:

Column 13,
Line 24, replace "wits" with -- with --.
Line 48, replace "MPC" with -- MPO --.

Column 14,
Line 26, replace "Exact" with -- EXACT --.
Line 48, replace "filer" with -- filler --.

Signed and Sealed this

Twenty-first Day of May, 2002

Attest:

JAMES E. ROGAN
*Attesting Officer*  *Director of the United States Patent and Trademark Office*